United States Patent [19]

Ohsawa

[11] 4,170,360

[45] Oct. 9, 1979

[54] APPARATUS FOR ADJUSTING THE POSITION OF AN ARM IN A RECORD PLAYING DEVICE, SUCH AS A PHONOGRAPH OR THE LIKE

[75] Inventor: Mitsuo Ohsawa, Fujisawa, Japan

[73] Assignee: Sony Corporation, Tokyo, Japan

[21] Appl. No.: 897,396

[22] Filed: Apr. 18, 1978

[30] Foreign Application Priority Data

Apr. 22, 1977 [JP] Japan .................................. 52-45801

[51] Int. Cl.² ............................................. G11B 3/10
[52] U.S. Cl. .................................... 274/23 R; 274/1R
[58] Field of Search ................ 274/10 R, 23 R, 23 A, 274/1 R

[56] References Cited

U.S. PATENT DOCUMENTS

| | | | |
|---|---|---|---|
| 3,042,410 | 7/1962 | Brandizzi | 274/10 R |
| 3,083,971 | 4/1963 | Andres | 274/10 R |
| 3,236,525 | 2/1966 | Moody | 274/10 R |
| 3,623,734 | 11/1971 | Sakamoto | 274/23 R |
| 3,830,505 | 8/1974 | Rabinow | 274/23 R |
| 3,907,306 | 9/1975 | Muller | 274/23 R |
| 4,023,130 | 5/1977 | Ridler et al. | 274/23 R |

*Primary Examiner*—Richard E. Aegerter
*Assistant Examiner*—John W. Shepperd
*Attorney, Agent, or Firm*—Lewis H. Eslinger; Alvin Sinderbrand

[57] ABSTRACT

Apparatus for controlling an arm of a record player of the type having a base, a turntable upon which a record disc rotates, a pivot support extending upward from the base for supporting the arm and about which pivot support said arm pivots in a plane perpendicular to the surface of the record disc, and a transducer at one end of the arm for scanning the record disc. Pivotal movement of the arm is detected and a position signal is produced to represent the angular position of the arm. A detecting circuit detects when the position signal differs from a predetermined reference signal, this difference corresponding to an angular displacement of the arm, to produce a control signal. A drive device is coupled to the pivot support and is responsive to the control signal for driving the pivot support in a direction perpendicular to the surface of the record disc so as to reduce the angular displacement of the arm and thereby adjust the position signal until it is equal to the predetermined reference level.

15 Claims, 6 Drawing Figures

APPARATUS FOR ADJUSTING THE POSITION OF AN ARM IN A RECORD PLAYING DEVICE, SUCH AS A PHONOGRAPH OR THE LIKE

BACKGROUND OF THE INVENTION

This invention relates to apparatus for controlling the position of an arm of a record player relative to a record disc and, more particularly, to such apparatus whereby a transducer which is provided at one end of the arm is enabled to scan a predetermined trace, such as a spiral groove, along the record disc regardless of deformations in the record disc, such as a warped surface.

In record players, such as in a phonograph record player, an optical record disc player, and the like, it is assumed that the surface of the record disc upon which prerecorded information is played back is flat. Thus, a playback transducer, such as a stylus which scans a spiral groove of the record disc, or an electrostatic or optical pickup device which scans spiral tracks, can have a relatively light force exerted thereon, thereby providing favorable playback characteristics. For example, in a phonograph record player, the force exerted on the stylus can be less than five grams, and preferably less than two grams, whereby vibrations in the stylus are due solely to undulations in the scanned groove. These stylus vibrations are, of course, translated into electrical signals which, in turn, are reproduced as high fidelity audio sounds. It is generally accepted that audio information is reproduced with greater fidelity if a lesser force is exerted on the stylus. Since the stylus generally is mounted at one end of a tone arm, the tone arm usually is counterbalanced so as to minimize the force exerted thereby on the stylus.

Unfortunately, although most phonograph record discs are manufactured with a relatively flat surface, it is quite common for a record disc to warp over a period of time. This deformation may arise due to the manner of storing, shipping or displaying phonograph record discs, and also may be due to various unfavorable conditions in the manner in which the user stores or maintains the record disc. In any event, if the record disc warps, the resultant deformations in the surface thereof exert vertical forces on the stylus when the warped record disc is played. These vertical forces have the effect of opposing the relatively light force exerted on the stylus by the tone arm, thereby resulting in the stylus skipping over a groove. Thus, the sound which is reproduced from the warped record disc by such a stylus is distorted, and is less than satisfactory.

One proposal for avoiding the skipping of a groove by the stylus in a record player due to surface deformations of a warped record disc is described in U.S. Pat. No. 3,623,734. Although this proposal generally is effective to prevent the stylus from skipping over a groove of a warped record disc, the apparatus described in this patent results in phase modulation distortion of the reproduced audio sounds. This phase modulation distortion is caused by movement of the stylus relative to the record disc in a radical direction. That is, since a surface deformation of the record disc appears as a vertical rise, the stylus which scans the record disc likewise will be moved in the vertical direction. Of course, the stylus usually is mounted in a cartridge which, in turn, is supported at one end of the pivotal tone arm. Hence, vertical movement of the stylus is translated into an angular movement of the tone arm about a pivot axis. Now, since the length of the tone arm is fixed, vertical movement of the stylus is accomplished by a radial, outward movement. The geometry which results in this radial movement can be seen from FIG. 1. Thus, when the stylus moves in the vertical direction, it also moves in the radial, or horizontal direction, with respect to the record disc. This horizontal movement, or horizontal velocity, of the stylus varies because of the surface deformations of the warped record disc. Such varying horizontal velocity produces a phase modulation distortion in the reproduced audio signals, resulting in a loss of fidelity of the audio sounds.

Another defect accompanying the proposal described in the above-mentioned patent specification is the introduction of crosstalk between left and right channels which are recorded in the same groove of a stereo record disc. Since the stylus is relatively fixed with respect to the tone arm, a pivotal movement, or angular displacement of the tone arm changes the vertical tracking angle of the stylus. That is, when the tone arm is in its normal, horizontal position, the stylus assumes its normal, vertical tracking angle with respect to the record groove. However, as the stylus is moved in the vertical direction, the tone arm pivots so as to change the vertical tracking angle of the stylus with respect to the groove. Consequently, whereas separate left and right audio channels which are recorded in the same groove are reproduced without crosstalk therebetween when the tone arm is in its proper, horizontal position, the change in the vertical tracking angle of the stylus caused by angular displacement of the tone arm introduces undesired crosstalk between these left and right audio channels.

Therefore, although the prior art provides apparatus wherein the stylus of a tone arm does not skip over a groove in a warped record, this apparatus is accompanied by undesired phase modulation distortion and crosstalk in the signals which are reproduced from the record groove by the stylus.

OBJECTS OF THE INVENTION

Therefore, it is an object of the present invention to provide improved apparatus for controlling the arm of a record player wherein the aforementioned disadvantages of the prior art are avoided even when the record player is used with a warped record disc.

Another object of this invention is to provide improved apparatus for controlling the position of an arm of a record player, relative to a record disc, wherein a transducer which is provided at one end of the arm is maintained in proper contact with a groove of the record disc and will not skip over a groove even if the record disc is warped.

A further object of this invention is to provide apparatus for controlling the arm of a record player such that the arm is maintained in a substantially constant angular position even if a transducer which is provided at one end of the arm scans a warped record disc.

An additional object of this invention is to provide apparatus which can be used advantageously in a phonograph record player, wherein the tone arm of the player is provided with a stylus at one end thereof, and wherein the tone arm, although vertically pivotable about a pivot support, is maintained in a substantially constant horizontal position, even in the presence of a warped phonograph record, by moving its pivot support vertically to compensate for vertical deformations in the phonograph record.

Yet another object of this invention is to provide apparatus of the foregoing type wherein phase modulation distortion and/or crosstalk distortion are avoided when the apparatus is used in conjunction with a warped record disc.

Various other objects, advantages and features of the present invention will become readily apparent from the ensuing detailed description, and the novel features will be particularly pointed out in the appended claims.

SUMMARY OF THE INVENTION

In accordance with the present invention, apparatus is provided for controlling the arm of a record player of the type having a base, a turntable upon which a record disc rotates, a pivot support extending upward from the base for supporting the arm and about which pivot support the arm pivots in a plane perpendicular to the surface of the record disc, and a transducer at one end of the arm for scanning the record disc. Pivotal movement of the arm about the pivot support is detected, and a position signal representing the angular position of the arm due to such pivotal movement is produced. A detecting circuit detects when this position signal differs from a predetermined reference signal, such difference corresponding to an angular displacement of the arm, so as to produce a control signal. A drive device is coupled to the pivot support and is responsive to the control signal for driving the pivot support in a direction perpendicular to the surface of the record disc so as to reduce the angular displacement of the arm. In one embodiment, the pivot support is mechanically coupled to a magnet, the pivot support and coupled magnet being movable, and this magnet is repelled from a fixed magnet. In this embodiment, the drive device includes a selectively energizable coil which changes the magnetic flux between the two magnets, thereby changing the repulsion of the movable magnet. In another embodiment, the drive device is a motor which is bi-directionally energized to raise or lower the pivot support.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
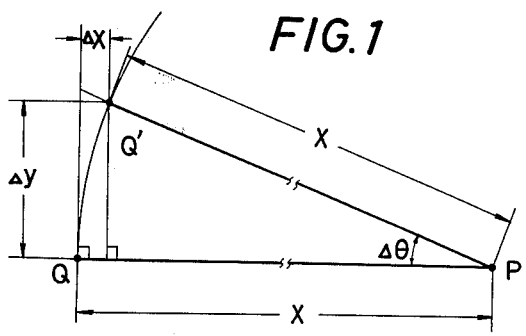
FIG. 1 is a geometric diagram which is useful in understanding the problems associated with the scanning of a warped record disc.

Before proceeding with a description of the present invention, reference is made to FIG. 1 which represents the geometry of a pivotal arm with respect to a record disc in a record player. For the purpose of the present discussion, it will be assumed that the record player is a phonograph record player, and that the arm is the tone arm which is provided with a stylus at one end thereof, and which is pivoted about a pivot support which is disposed near the other end thereof. Let it be assumed that the tone arm has a length x between its pivot point P, that is, the point at which it is pivotally supported, and the end Q at which a stylus is provided. Point P, also referred to herein as the pivot point, is disposed so as to permit the tone arm to be pivoted in a plane which is perpendicular to the surface of the phonograph record whose spiral groove is scanned by the stylus. In normal use, the surface of the record disc defines a horizontal plane, and the tone arm thus is pivotal in a vertical plane.

Let it be assumed that the record disc is warped and, therefore, is provided with surface deformations which appear as vertical excursions. Hence, the stylus which rides upon the surface of the record disc, and thus scans the spiral groove thereof, will be displaced in the vertical direction as a function of such surface deformations. This vertical displacement of the stylus is shown as $\Delta y$ in FIG. 1. Because the tone arm is fixed to pivot point P, the vertical displacement $\Delta y$ of the stylus results in an angular displacement $\Delta \theta$. Hence, the stylus is displaced from a position Q, with respect to the record disc, to a position Q'. Consequently, the vertical displacement $\Delta y$ of the stylus and the angular displacement $\Delta \theta$ of the tone arm also results in a radial displacement $\Delta x$ of the stylus. This radial displacement $\Delta x$ is in the horizontal direction, and the stylus thus is shifted outwardly along a radius of the record disc. This horizontal displacement $\Delta x$ is a function of the vertical displacement $\Delta y$ and will be explained as follows:

The horizontal displacement $\Delta x$ is related to the angular displacement $\Delta \theta$ and the length x of the tone arm in accordance with the following expression:

$$\Delta x = x(1 - \cos \Delta \theta) \quad (1)$$

The expression $\cos \Delta \theta$ can be replaced by its equivalent so as to form $$\Delta x = x(1 - \sqrt{1 - \sin^2 \Delta \theta}) \quad (1a)$$

It is appreciated that the vertical displacement $\Delta y$ due to the warped record disc is very small when compared to the length x of the tone arm. Likewise, the angular displacement $\Delta \theta$ of the tone arm is quite small. Hence, equation (1a) can be rewritten by the approximate equation $$\Delta x \approx x\left(1 - \sqrt{1 - \left(\frac{\Delta y}{x}\right)^2}\right) \quad (2)$$

Equation (2) is equivalent to $$\Delta x \approx x \cdot \frac{1}{2} \cdot \frac{\Delta y^2}{x^2} \quad (2a)$$

resulting in the following close approximation for the horizontal displacement of the stylus due to vertical deformations of the warped record disc:

$$\Delta x \approx \frac{1}{2} \cdot \frac{\Delta y^2}{X} \tag{2b}$$

Since the record disc is warped, the vertical displacement $\Delta y$ of the stylus changes with respect to time. As appears from equation 2(b), this change in the vertical displacement with time results in a change in the horizontal displacement with respect to time. That is, the horizontal velocity of the stylus varies as the stylus traces a sound groove in a warped record disc. This change or shift in the horizontal position of the stylus with respect to the record disc is detected as phase modulation distortion in the reproduced audio sound.

As also may be seen from FIG. 1, when the angular displacement $\Delta \theta$ is zero, the vertical tracking angle of the stylus with respect to the record disc is a predetermined angle. For example, this vertical tracking angle may be 90°. That is, the stylus appears to be normal with respect to the surface of the record disc. However, when the tone arm undergoes an angular displacement $\Delta \theta$ because of vertical deformations of the record disc, the vertical tracking angle of the stylus changes. This changed vertical tracking angle now may be equal to $90° - \Delta \theta$. As a consequence thereof, if the record disc is a stereo record of the type wherein separate left and right audio channels are recorded in a common groove, this changed vertical tracking angle may introduce crosstalk between the reproduced left and right audio channels.

Figure 2:
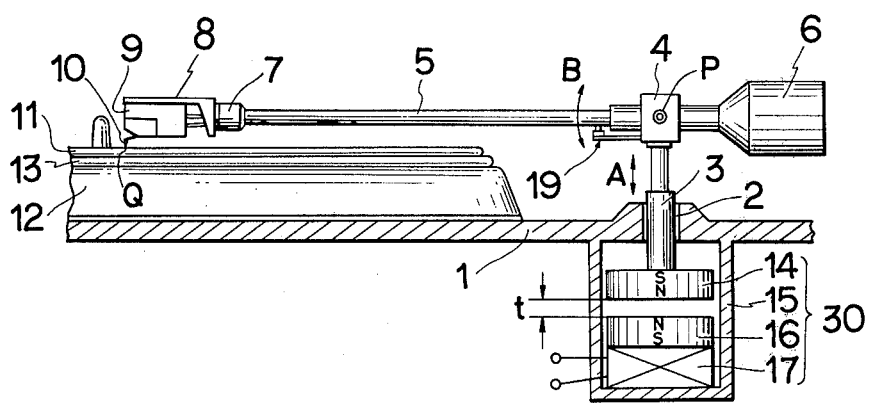
FIG. 2 is a schematic side view of one embodiment of apparatus in accordance with the present invention.

The present invention overcomes the aforenoted problems of horizontal displacement of the stylus and changed vertical tracking angle due to vertical displacement caused by deformations in the record. This is achieved by maintaining the tone arm in its horizontal position; that is, the angular displacement $\Delta \theta$, seen in FIG. 1, is reduced to zero. In order to restore the tone arm to its horizontal position relative to the record disc, pivot point P is elevated (or lowered) by an amount $\Delta y$, thereby maintaining the tone arm in its horizontal position so as to avoid a horizontal displacement $\Delta x$ in the stylus and to avoid a change in the vertical tracking angle of the stylus. This control over the tone arm in response to the scanning of a warped record disc is effected by the apparatus shown in FIG. 2. For the purpose of the present discussion, the apparatus shown in FIG. 2 is depicted in the environment of a phonograph record player. However, and as will soon be understood, the principles of the present invention are equally applicable to recording apparatus wherein sound or other information is recorded by a scribing stylus which scans a groove over the record disc, or other types of record players wherein a transducer scans circular or spiral tracks on a record disc.

The apparatus shown in FIG. 2 includes a base 1 upon which a turntable 12 is supported and rotatably driven by a suitable drive mechanism (not shown). Turntable 12 includes a rubber mat 13 upon which a record disc 11 is supported and is rotatably driven by the rotation of turntable 12.

Base 1 additionally is provided with an aperture 2 for receiving a vertical post 3 which is slidably movable in aperture 2. The upper end or portion of post 3 is mechanically coupled to a pivotal support bearing 4 which is adapted to pivotally support an arm 5. Bearing 4, in combination with post 3, functions as a fulcrum to define a pivot axis P about which arm 5, which may be the tone arm of a phonograph record player, pivots.

A stylus 10, or other pickup or recording transducer, is supported at one end of arm 5 remote from pivot axis P. As is conventional in the phonograph record player art, stylus 10 projects from a pickup cartridge 9, the latter being mounted in a shell 8 which, in turn, is secured via a connector 7 to arm 5. Typically, stylus 10 is cantilevered from cartridge 9, and the cartridge may be secured to shell 8 by screws, mounting clips or other elements by which the cartridge can be removed, if desired, from the shell. It is appreciated that, as stylus 10 scans a spiral groove on the surface of record disc 11, the stylus moves in the radial direction from an outer turn to an inner turn of the record disc. To facilitate this radial movement of the stylus, post 3, to which the arm is secured, is adapted for rotation about a vertical axis. Furthermore, in order to place record disc 11 on turntable 12 and to remove the record disc therefrom, and also to selectively position stylus 10 at any desired location on the surface of record disc 11, and further, to account for vertical deformation of the record disc, arm 5 is pivotal about pivot axis P in a vertical plane, that is, in a plane normal to the surface of record disc 11. This pivotal movement of the arm is represented by arrow B shown in FIG. 2.

At the other end of arm 5 remote from stylus 10, a counterweight 6 is provided to produce a moment about pivot axis P that is counter to the moment about this pivot axis due to stylus 10, cartridge 9, shell 8 and the weight of the tone arm itself. As is conventional, the distance of counterweight 6 from pivot axis P may be adjustable so as to vary the overall force exerted on stylus 10.

As mentioned above, in order to compensate for an angular displacement $\Delta \theta$ of tone arm 5 about pivot axis P caused by a vertical displacement $\Delta y$ in stylus 10 because of vertical deformations in a warped record disc 11, the position of pivot axis P is vertically adjustable. That is, bearing 4, which extends upward from base 1, and which is supported by post 3 is adapted to be driven bi-directionally in the vertical direction represented by arrow A. This is achieved by securing a disc-type magnet 14 to the lower end of post 3, that is, to the end of the post which is remote from bearing 4. Since post 3 is bi-directionally movable in the direction A, it is appreciated that magnet 14, secured to an end thereof, likewise is bi-directionally movable. Another disc-type magnet 16 is fixedly positioned relative to magnet 14 and, during normal positioning of arm 5 in the horizontal direction, is spaced from magnet 14 by the amount t. That is, magnet 16 is disposed beneath magnet 14. These magnets have their magnetic polarities arranged so as to be opposite each other, thereby providing a repelling force therebetween. As shown in FIG. 2, the north magnetic pole of magnet 14 faces the north magnetic pole of magnet 16, resulting in a magnetic force exerted on magnet 14 so as to space this magnet from magnet 16 by the amount t. A selectively energizable coil 17 also is provided and cooperates with magnet 16 so as to generate a controllably variable flux which varies the repelling force imparted to magnet 14. It is appreciated that, as the current through coil 17 varies so as to vary the magnetic flux generated thereby, the repulsion of magnet 14 varies so as to correspondingly vary the spacing t from magnet 16. For example, if the current through coil 17 is increased, the repelling force is increased so as to move magnet 14, post 3 and bearing 4 in a vertically upward direction so as to increase spacing t. Conversely, if the current through coil 17 is decreased, the repelling force likewise is decreased so as to move magnet 14, post 3 and bearing 4 in a vertically downward direction so as to reduce the spacing t. In order to restrain lateral movement of magnet 14 and post 3, magnets 14 and 16 and coil 17 are provided in a guide channel 15, this guide channel being positioned beneath base 1 so as to guide magnet 14, post 3 and bearing 4 in the vertical direction. That is, guide channel 15 serves to restrain undesired lateral movement of pivot axis P. For the purpose of the present discussion, elements 14-17 are sometimes referred to herein as a pivot axis drive mechanism 30. As will be described in greater detail below, drive mechanism 30 is selectively energized so as to correspondingly change the height of the pivot axis, or fulcrum P.

A detector 19 is provided to detect angular displacement of arm 5 in the event that stylus 10 is vertically displaced because of surface deformations of warped record disc 11. One embodiment of detector 19 will be described in greater detail below with respect to FIG. 4. Suffice it to say that, as arm 5 is angularly displaced about pivot axis P, a corresponding position signal representative of such angular displacement is produced by detector 19. Accordingly, if a surface deformation of record disc 11 is scanned by stylus 10, it is appreciated that the stylus is displaced in the vertical direction. This vertical displacement of stylus 10 results in a corresponding angular displacement of arm 5 about pivot axis P, and the angular displacement of arm 5 is detected by detector 19 which, in turn, produces a position signal representing the angular position, or displacement, of the arm. A control circuit, described below with respect to FIGS. 5 and 6, receives this position signal and determines whether the position signal differs from a predetermined reference level. Of course, an angular displacement of arm 5 will be sensed as a difference of the position signal from the reference level. Hence, a control signal is produced in response to this determined difference, and the control signal is used to selectively energize coil 17. Therefore, as a result of the selective energization of coil 17, magnet 14 is further (or lesser) repelled from magnet 16, thereby changing separation t therebetween. Post 3 is vertically displaced in the direction A, resulting in reducing the angular displacement of arm 5. That is, if stylus 10 is displaced upwardly, pivot axis P is raised so as to return the arm to its proper, horizontal position. If stylus 10 is lowered because of the surface deformation of record disc 11, pivot axis P likewise is lowered so as to compensate, or correct for the angular displacement of arm 5.

Figure 3:
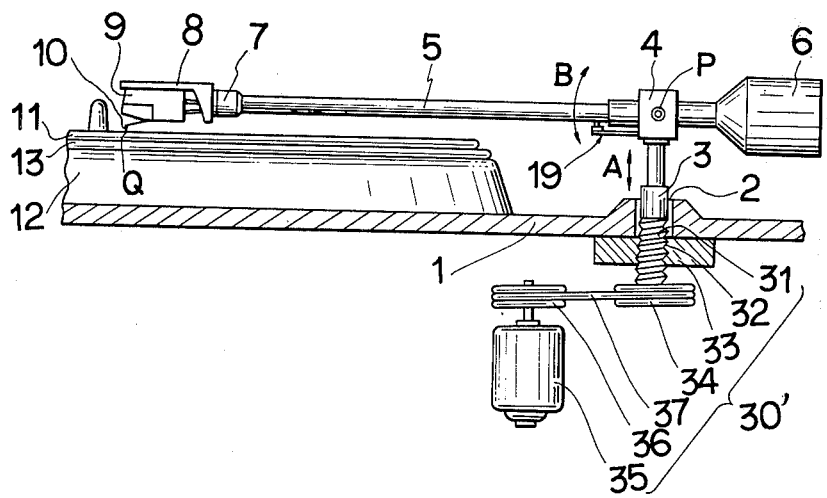
FIG. 3 is a schematic side view of another embodiment of apparatus in accordance with the present invention.

Another embodiment of pivot axis drive mechanism 30 is shown in FIG. 3 and is identified by reference numeral 30'. As shown herein, post 3 is secured to a screw member 31, such as a worm gear, which is adapted to rotate in a threaded support 33 attached to base 1. As shown, threaded support 33 includes screw threads 32 which mate with the threads of screw member 31. While one end of screw member 31 is secured to post 3, the other end thereof is mechanically coupled to a pulley 34. A drive belt 37 couples pulley 34 to a drive pulley 36, the latter being coupled to the drive shaft of a servo-controlled bi-directional drive motor 35.

In operation, a suitable motor control circuit, described in greater detail below with respect to the embodiments shown in FIGS. 5 and 6, selectively energizes drive motor 35 in accordance with the detected angular displacement of arm 5. If, because of a surface deformation of record disc 11, arm 5 is angularly displaced in the upward direction, drive motor 35 is energized so as to rotate pulleys 36 and 34 in a direction whereby screw member 32 is driven upwardly in threaded support 33. Hence, post 3 is moved in the upward direction so as to elevate pivot axis P. This, in turn, cancels the angular displacement of arm 5. Conversely, if arm 5 is angularly displaced in the downward direction because of a surface deformation of record disc 11, drive motor 35 is selectively energized so as to be driven in the opposite direction, whereby pulleys 36 and 34 also are rotated in the opposite direction to rotate screw member 32 in threaded support 33 such that the screw member is driven downwardly. Hence, post 3 also is moved in the downward direction so as to lower pivot axis P and thus cancel the angular displacement of arm 5.

Although the transmission assembly which is shown in FIG. 3 as a coupling between drive motor 35 and screw member 32 is illustrated as belt-driven pulleys, it is appreciated that, if desired, other conventional transmission assemblies can be used. For example, a suitable gear-box assembly may be provided to couple motor 35 to screw member 32. Such a gear box may exhibit a 1:1 gear ratio, or a step-up or step-down ratio, if desired. Furthermore, it is appreciated that, in the embodiment shown in FIG. 3, the coupling provided between screw member 32 and post 3 may include a bearing, or other suitable coupling whereby the screw member is permitted to rotate with respect to the post.

As a further modification of pivot axis drive mechanism 30', a cammed piston may be selectively driven by a motor so as to bi-directionally displace post 3 in the vertical direction. As yet another modification, a pneumatic or hydraulic piston may be used to selectively elevate and lower pivot axis P in order to cancel an angular displacement of arm 5.

Figure 4:
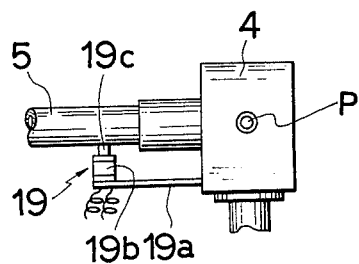
FIG. 4 is a schematic side view of a portion of the apparatus used in the embodiments shown in FIGS. 2 and 3.

Referring now to FIG. 4, there is illustrated one embodiment of detector 19 which is adapted to detect the angular displacement of arm 5. The detector is comprised of a fixed support 19a attached to bearing 4 and extending in a substantially horizontal position. It is appreciated that, although bearing 4 is movable in the vertical direction, by reason of the vertical movement of post 3, the bearing is fixed against angular movement. Hence, support 19a likewise is fixed against angular movement. The opposite, or free end of support 19a has a coil 19b supported thereon. A movable core 19c is secured to arm 5 and depends from the arm in alignment with the central portion of core 19b. Thus, as arm 5 is displaced angularly about pivot axis P, it is appreciated that core 19c likewise is displaced with respect to support 19a and, particularly, with respect to coil 19b. That is, core 19c is selectively inserted into and withdrawn from the coil, thereby changing the effective inductance of the coil. Consequently, the amount of angular displacement of arm 5 is reflected by the amount of change in the inductance of coil 19b. This change in inductance can be used to vary the frequency or phase of an oscillating signal. That is, coil 19b may provide the variable inductance of a variable oscillator, a variable phase shifter or the like.

As another example, coil 19b may be replaced by a potentiometer whose wiper is mechanically secured to arm 5. As the arm is angularly displaced, the position of the wiper correspondingly changes so as to vary the effective resistance of the potentiometer. This variable resistance can be used to correspondingly vary the magnitude of a position signal, such as the DC level of a signal, thus representing the angular position of arm 5 about pivot axis P. Still further elements can be used to constitute detector 19. For example, an optical position detector formed of a light source and photoresistive device can be coupled to arm 5 such that the effective resistance of the photoresistive device is varied by the amount of light impinging thereon as a function of the angular displacement of the arm. As an alternative, the photoresistive device can be replaced by a phototransistor, or the like. As yet an additional example, position detector 19 can be formed of a variable capacitor, such as an air capacitor, whose effective capacitance is varied as a function of the angular displacement of arm 5 about pivot axis P.

Figure 5:
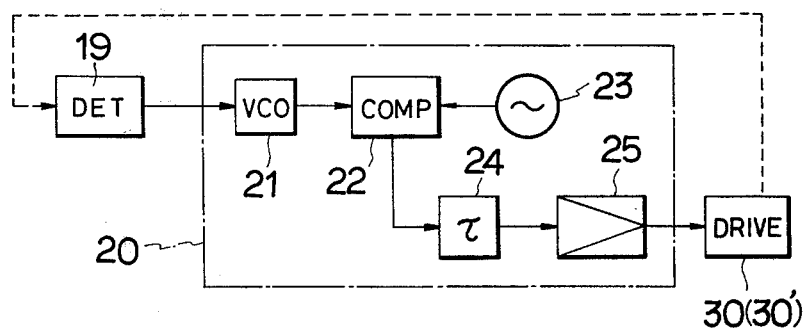
FIG. 5 is a block diagram of one embodiment of electrical control apparatus in accordance with this invention.

One embodiment of drive control circuitry which can be used to compensate the angular displacement of arm 5 which is detected by position detector 19 is shown in FIG. 5. Control circuitry 20 is used to selectively drive pivot axis drive mechanism 30 (or 30') in response to the position signal supplied thereto by position detector 19. In the illustrated embodiment, control circuitry 20 is comprised of a variable oscillator 21, such as a voltage-controlled oscillator (VCO), a reference oscillator 23, a comparator 22, a filter 24 and a drive amplifier 25. VCO 21 may be of the type which is adapted to generate an oscillating signal whose frequency or phase is determined by the inductance of an inductive element included therein. For example, the frequency or phase of the oscillating signal generated by VCO 21 may be determined by the effective inductance of coil 19b of position detector 19 (FIG. 4).

Comparator 22 is adapted to detect the frequency or phase difference between the oscillating signals generated by VCO 21 and reference oscillator 23. Accordingly, comparator 22 includes two inputs connected to VCO 21 and to reference oscillator 23, respectively. Frequency and phase comparators are well known in the art and, therefore, further description of comparator 22 is not provided. Suffice it to say that the output of comparator 22 is an error signal which is proportional to the frequency difference between the oscillating signals supplied thereto. If comparator 22 is a phase comparator, then the output produced thereby is a signal which is proportional to the phase difference between the oscillating signals generated by VCO 21 and reference oscillator 23. In either embodiment, it is appreciated that the output of comparator 22 is proportional to the difference between a particular characteristic in the signals supplied thereto. This output, or difference signal, is a control signal.

Filter 24 is connected to the output of comparator 22 and functions as a loop filter to prevent malfunction or oscillation of the illustrated servo circuit. Filter 24 thus may be a low pass filter. The output of this filter is coupled to drive amplifier 25 which, in turn, is connected to pivot axis drive mechanism 30 (or 30').

In operation, let it be assumed that arm 5 assumes its proper horizontal position. If position detector 19 is of the type shown in FIG. 4 wherein the inductance of coil 19b is varied as a function of the angular displacement of arm 5, it is further assumed that, when the arm is in its horizontal position, the frequency or phase of the oscillating signal generated by VCO 21 is equal to the frequency or phase of the reference signal generated by reference oscillator 23. Hence, comparator 22 detects a zero difference in the frequency or phase of the respective signals supplied thereto. Accordingly, the control signal produced by comparator 22 has a predetermined level. This control signal, after filtering by loop filter 24, is amplified by drive amplifier 25 so as to drive pivot axis drive mechanism 30 (or 30') to maintain arm 5 in its proper horizontal position. For example, if the drive mechanism is of the type which includes electromagnetic coil 17, shown in FIG. 2, then the energization of this coil may be such that magnets 14 and 16 are separated by distance t. If the drive mechanism is of the type shown in FIG. 3, then motor 35 may be de-energized.

If arm 5 is displaced upwardly because of a surface deformation on record disc 11, then core 19c (FIG. 4) is withdrawn from coil 19b, thereby reducing the effective inductance of the coil. This, in turn, changes the frequency or phase of the oscillating signal generated by VCO 21. Accordingly, comparator 22 produces a difference signal which is a function of the angular displacement of arm 5 about pivot axis P. This difference signal is filtered and amplified by amplifier 25 so as to suitably drive pivot axis drive mechanism 30 (or 30') in the upward direction. That is, the energization of coil 17 increases so as to increase the repelling force exerted on magnet 14; or drive motor 35 is driven in a direction to rotate screw member 32 such that the screw member is driven upwardly. As pivot axis drive mechanism 30 is driven so as to elevate bearing 4 and pivot axis P, it is appreciated that the angular displacement of arm 5 is reduced. Thus, the frequency or phase of the oscillating signal generated by VCO 21 is changed in a direction so as to be equal to the frequency or phase of the oscillating signal generated by reference oscillator 23. This reduces the difference signal produced by comparator 22 so as to reduce the drive of pivot axis drive mechanism 30 (or 30'). When arm 5 once again is aligned in the horizontal direction, that is, when the angular displacement of the arm is reduced to zero, the difference, or control signal produced by comparator 22 is returned to its predetermined level. This terminates the drive signal applied to pivot axis drive mechanism 30 (or 30').

It is recognized that a similar operation is performed if arm 5 is angularly displaced in the downward direction. For example, if stylus 10 is lowered because of a surface deformation of record disc 11, the resultant angular displacement of arm 5 results in inserting core 19c into coil 19b. This increases the inductance of the coil, thereby changing the frequency or phase of the oscillating signal generated by VCO 21. Therefore, comparator 22 produces a control signal which is filtered and amplified and then applied to pivot axis drive mechanism 30 (or 30'). As a consequence thereof, the pivot axis drive mechanism is driven in a direction so as to lower post 3, and thus lower pivot axis P. Accordingly, arm 5 is restored to its proper, horizontal position.

If the control signal produced by comparator 22 is a DC control signal, the polarity thereof may be determined by the direction in which arm 5 is angularly displaced. This polarity of the control signal will, in turn, drive pivot axis drive mechanism 30 (or 30') in the direction whereby pivot axis P is raised or lowered so as to cancel the angular displacement of arm 5 and thus return the position signal produced by position detector 19 (e.g. the frequency of phase of the oscillating signal produced by VCO 21) to the reference level.

The broken line extening between pivot axis drive mechanism 30 (30') and position detector 19 in FIG. 5 indicates that the drive mechanism and detector, taken with control circuitry 20, comprise a servo loop. The selective energization of drive mechanism 30 (30') changes the angular displacement of arm 5 which is detected by position detector 19. This detected change in angular displacement, or position, then is used to modify the energization of drive mechanism 30 (30'). Thus, the operation, or condition, of the drive mechanism is fed back to detector 19 whereat such operation or condition is detected. This servo loop functions as a phase-locked loop control circuit wherein the phase or frequency of the position signal generated by VCO 21 is synchronized or locked to the phase or frequency of the reference signal generated by reference oscillator 23.

Figure 6:
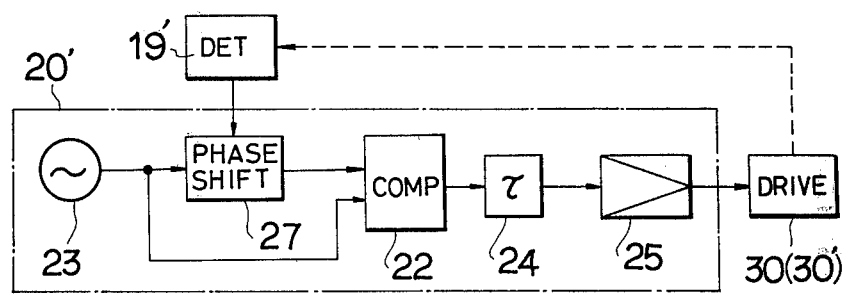
FIG. 6 is a block diagram of another embodiment of electrical control apparatus in accordance with this invention.

Another embodiment of control circuitry which can be used with the present invention is shown as control 20' in FIG. 6. Control circuit 20' is seen to be substantially similar to aforedescribed control circuit 20 except that VCO 21 is replaced by a variable phase shift circuit 27. The phase shift imparted to the signal which is supplied to phase shift circuit 27 is determined by the effective inductance of coil 19b included in position detector 19, shown in FIG. 6 as detector 19'. Alternatively, the phase shift established by phase shift circuit 27 may be determined by the effective resistance or capacitance of an adjustable resistor or capacitor which may be used to constitute position detector 19'. This phase shift circuit is connected at an input thereof to reference oscillator 23 and at an output thereof to comparator 22. Thus, in the embodiment shown in FIG. 6, comparator 22 is a phase comparator which is adapted to compare the phase of the reference signal generated by reference oscillator 23 to a phase-shifted version of the reference signal, as produced by phase shift circuit 27.

In operation, when arm 5 is disposed in its proper horizontal position, position detector 19' establishes the phase shift imparted by phase shift circuit 27 to be substantially equal to zero. Hence, the phase of the position signals supplied to comparator 22 by phase shift circuit 27 is equal to the phase of the reference signal supplied to the comparator by reference oscillator 23. In the event of an angular displacement of arm 5, this angular displacement is detected by position detector 19' to correspondingly vary the phase shift established by phase shift circuit 27. Thus, because of this angular displacement of the arm, the phase of the position signal supplied to comparator 22 by phase shift circuit 27 will differ from the phase of the reference signal. This phase difference is detected by comparator 22 so as to produce a control signal of the type described hereinabove. Consequently, pivot axis drive mechanism 30 (or 30') is suitably driven in a direction so as to cancel the angular displacement of arm 5, and thus reduce the phase shift imparted by phase shift circuit 27. That is, the phase of the position signal is driven to be equal to the phase of the reference signal. A substantially zero phase difference therebetween is detected by comparator 22 when arm 5 has been returned to its horizontal position.

In the embodiment of FIG. 6, phase shift circuit 27 may be a voltage-controlled phase shifter. For example, the phase shift circuit may include a voltage-controlled capacitor (varicap diode) which is supplied with a control voltage by position detector 19'. In that embodiment, the position detector may generate a variable voltage depending upon the detected angular displacement of arm 5. For example, position detector 19' may be formed of a mechanically variable or photo-optically variable resistor, as described above.

It is recognized that the embodiments shown in FIGS. 5 and 6 operate in a substantially similar manner. Control circuit 20 or 20' supplies a driven signal to pivot axis drive mechanism 30 (or 30') which is a function of the angular displacement of arm 5 as detected by position detector 19 or 19'. In both embodiments, the pivot axis drive mechanism is driven in a direction to raise or lower bearing 4 so as to cancel the detected angular displacement of the arm. In the preferred embodiment, the servo loop formed of detector 19 (19'), control circuit 20 (20') and drive mechanism 30 (30') functions to maintain arm 5 in a horizontal position. If desired, stylus 10 may be so mounted with respect to the arm that arm 5 desirably is maintained in another reference position. In that event, the illustrated servo loops function to maintain the arm in that predetermined, reference position even in the presence of surface deformations of a warped record disc 11. Thus, angular displacements due to such surface deformations in the record disc are counterbalanced. In the embodiments of FIGS. 5 and 6, it is preferred that reference oscillator 23 include a crystal oscillator so as to exhibit superior temperature stability characteristics. Since control circuit 20' includes only a single oscillator (VCO 21 having been omitted), the cost of this control circuitry is somewhat less than the cost of control circuitry 20. In both embodiments, the control circuitry can be fabricated in the form of an integrated circuit.

Although not shown herein, it is contemplated that yet another embodiment of the control circuitry can be used in accordance with the teachings of the present invention. In such a further embodiment, the level of a variable voltage is controlled by position detector 19, and this controlled voltage level is compared to a reference level. In one implementation of such an embodiment, comparator 22 is a voltage comparator, such as a difference amplifier, supplied with a variable DC voltage. Reference oscillator 23 thus may be replaced by a reference voltage generator, such as a stable DC source.

In accordance with the present invention, the horizontal displacement $\Delta x$ (FIG. 1) in the position of the stylus with respect to the record disc, due to vertical displacement of the stylus because of surface deformations of the record disc, is avoided. Thus, phase modulation distortion, which is present in prior art stylus control proposals, is eliminated. Furthermore, the vertical tracking angle of the stylus is maintained constant, so as to prevent crosstalk between left and right audio channels during reproduction of a stereo phonograph record. This, of course, is attained by selectively adjusting the vertical position of pivot axis P, which is the fulcrum about which arm 5 rotates.

While the present invention has been particularly shown and described with respect to certain preferred embodiments, it will be readily apparent to one of ordinary skill in the art that various changes and modifications in form and details can be made without departing from the spirit and scope of the invention. Examples of such changes and modifications have been described above. It is intended that the appended claims be interpreted as including these as well as other such changes and modifications.

What is claimed is:

1. Apparatus for controlling an arm of a record player of the type having a base, a turntable upon which a record disc rotates, a pivot support extending upward from said base for supporting said arm and about which said pivot support arm pivots in a plane perpendicular to the surface of said record disc, and a transducer at one end of said arm for scanning said record disc, said apparatus comprising means for detecting pivotal movement of said arm about said pivot support to produce a position signal representing the angular position of said arm; detecting menas for detecting when said position signal differs from a predetermined reference level, corresponding to an angular displacement of said arm to produce a control signal; and drive means coupled to said pivot support and responsive to said control signal for driving said pivot support in a direction perpendicular to said surface of said record disc so as to reduce said angular displacement of said arm and thereby drive said position signal to said predetermined reference level.

2. The apparatus of claim 1 wherein said detecting means comprises comparator means for receiving said position signal and said predetermined reference level to produce said control signal in accordance with the difference therebetween; and reference means for supplying said predetermined reference level.

3. The apparatus of claim 2 wherein said reference means comprises oscillator means for generating an oscillating signal of predetermined frequency; said means for detecting pivotal movement of said arm includes varying means for varying the frequency of said position signal as a function of said angular displacement of said arm; and said comparator means comprises frequency detecting means for detecting the frequency difference between said position signal and said oscillating signal.

4. The apparatus of claim 2 wherein said reference means comprises oscillator means for generating an oscillating signal of predetermined phase; said means for detecting pivotal movement of said arm includes varying means for varying the phase of said position signal as a function of said angular displacement of said arm; and said comparator means comprises phase detecting means for detecting the phase difference between said position signal and said oscillating signal.

5. The apparatus of claim 3 or 4 wherein said varying means comprises controllable oscillating means for generating an oscillating position signal whose frequency varies as a function of said angular displacement of said arm.

6. The apparatus of claim 5 wherein said controllable oscillating means comprises a coil fixedly disposed with respect to pivotal movement of said arm; and an adjustable core coupled to and movable with said arm so as to be displaced with respect to said coil as said arm pivots, thereby changing the effective inductance of said coil.

7. The apparatus of claim 4 wherein said varying means comprises phase shift means coupled to said oscillator means for varying the phase of said oscillating signal, the output of said phase shift means corresponding to said position signal.

8. The apparatus of claim 2 wherein said reference means comprises voltage generating means for generating a reference voltage of predetermined magnitude; said means for detecting pivotal movement of said arm includes voltage varying means for varying the voltage magnitude of said position signal as a function of said angular displacement of said arm; and said comparator means comprises voltage difference means for detecting the voltage difference between said position signal and said reference voltage.

9. The apparatus of claim 1 wherein said pivot support comprises a bi-directionally movable fulcrum adapted to be driven by said drive means in a direction perpendicular to said surface of said record disc.

10. The apparatus of claim 9 wherein said drive means comprises electromagnetic means energized in response to said control signal, said movable fulcrum being mechanically coupled to said electromagnetic means.

11. The apparatus of claim 10 wherein said electromagnetic means comprises a first magnet member mechanically coupled to said movable fulcrum and being disposed for bi-directional movement; a second magnet member opposed to said first magnet member for generating magnetic flux in opposition to the magnetic flux generated by said first magnet member to impart a repelling force to said first magnet member; and a coil energized in response to said control signal for generating a flux to vary the repelling force imparted to said first magnet member such that the position of said first magnet member varies to correspondingly move said movable fulcrum.

12. The apparatus of claim 11 further comprising a guide channel positioned beneath said movable fulcrum for receiving said first and second magnet members and said coil so as to guide said first magnet member for movement substantially only in the direction perpendicular to said surface of said record disc.

13. The apparatus of claim 9 wherein said drive means comprises a bi-directional motor selectively energized in accordance with said control signal, said movable fulcrum being mechanically coupled to said motor.

14. The apparatus of claim 13 further comprising a screw member, said movable fulcrum being mechanically coupled to said screw member; a threaded support for receiving said screw member and in which said screw member rotates, said movable fulcrum being moved upward or downward with respect to said base in accordance with the direction of rotation of said screw member; and means for coupling said motor to said screw member for driving the latter.

15. The apparatus of claim 9 wherein said surface of said disc defines a horizontal plane; and said movable fulcrum comprises a vertical post having one end coupled to said drive means to be moved in the vertical direction thereby, and a bearing disposed at the other end of said post for pivotally supporting said arm, whereby said arm pivots in a vertical plane.

* * * * *